(12) United States Patent
Huston et al.

(10) Patent No.: US 8,144,251 B2
(45) Date of Patent: Mar. 27, 2012

(54) OVERLAID IMAGES ON TV

(75) Inventors: James Huston, Boulder Creek, CA (US); Yuko Nishikawa, La Jolla, CA (US); John Salisbury, Carlsbad, CA (US); Monish Subherwal, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1013 days.

(21) Appl. No.: 12/106,076

(22) Filed: Apr. 18, 2008

(65) Prior Publication Data

US 2009/0262135 A1 Oct. 22, 2009

(51) Int. Cl.
*H04N 9/76* (2006.01)

(52) U.S. Cl. ........ 348/598; 348/584; 348/590; 348/591; 345/629

(58) Field of Classification Search ........... 348/584, 348/585, 590, 591, 597, 598, 788, 768; 345/629
See application file for complete search history.

(56) References Cited

U.S. PATENT DOCUMENTS

| | | | |
|---|---|---|---|
| 5,651,107 A * | 7/1997 | Frank et al. | 715/768 |
| 6,246,407 B1 | 6/2001 | Wilks et al. | |
| 6,353,450 B1 | 3/2002 | Deleeuw | |
| 7,623,140 B1 * | 11/2009 | Yeh et al. | 345/629 |
| 7,720,312 B2 * | 5/2010 | Maier et al. | 382/302 |
| 2004/0075670 A1 | 4/2004 | Bezine et al. | |
| 2007/0204297 A1 * | 8/2007 | Gonzalez | 725/41 |

OTHER PUBLICATIONS

Karl Gyllstrom, David Slotts, "Facetop: Integrated semi-transparent video for enhanced natural pointing in shared screen collaboration", http://rockfish.cs.unc.edu/pubs/TR05-010.pdf, May 15, 2005.
SOREN BOG, "SoC 2007 Project Dynamic Video Overlays", http://wiki.videolan.org/SoC_2007_Project_Dynamic_Video_Overlay#Why.

* cited by examiner

*Primary Examiner* — Brian Pendleton
*Assistant Examiner* — Nnenna Ekpo
(74) *Attorney, Agent, or Firm* — John L. Rogitz

(57) ABSTRACT

An ambient, beautiful, entertaining visual experience that can be displayed on a TV requiring little or no user interaction beyond initiation. Multiple image layers that may be still or moving video, photos, etc, or a combination thereof can be overlaid on each other.

6 Claims, 4 Drawing Sheets

"Lens Flare" Theme

"Pop Clock" Theme

| TV Model | Access | User's Current Mode | Visual | Audio |
|---|---|---|---|---|
| TV Models with no photo/music XMB Category | Options/ <Favorites> | RF/Composite | LVT | LVT |
| TV Models with no photo/music XMB Category | Options/ <Favorites> | HDMI, Component, PC | Built-in Photo | Built-in Audio |
| TV Models with photo/music XMB Category | Options/ <Favorites> | RF/Composite | LVT | LVT |
| TV Models with photo/music XMB Category | Options/ <Favorites> | USB, DLNA HDMI, Component, PC | Visual Priority List | Audio Priority List |
| TV Models with photo/music XMB Category | Options/ <Favorites> | DMPort | Visual Priority List | DMPort |

FIG. 5

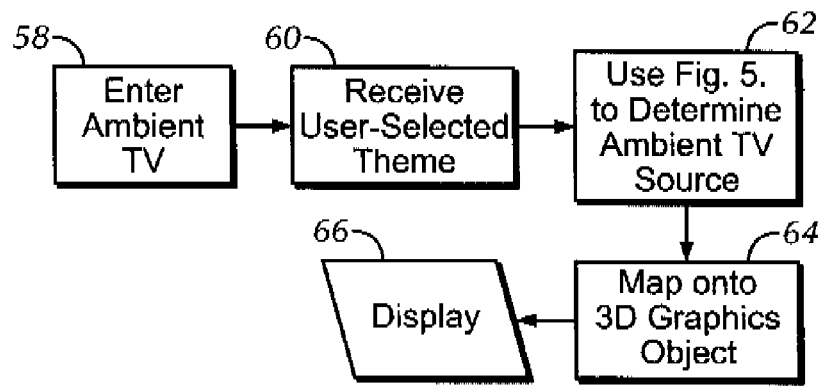

FIG. 6

OVERLAID IMAGES ON TV

FIELD OF THE INVENTION

The present invention relates generally to overlaying images with varying levels of transparency onto a solid TV image, e.g., moving or still video or photos.

BACKGROUND OF THE INVENTION

The increasing capability of TV processing affords heretofore unexplored features that leverage TV operational habits. As recognized herein, one habit that people have developed over the years is leaving their TVs energized in the background even when not being actively watched.

SUMMARY OF THE INVENTION

A TV system has a TV display and a processor receiving a user signal to enter a special mode in which a first semi-transparent image layer is superimposed onto a solid base image layer and both layers are presented simultaneously on the TV display.

In some embodiments a second semi-transparent image layer may be overlaid onto the first semi-transparent image layer. The first semi-transparent image layer can be characterized by an alpha blend that may be dynamic such that the transparency of the first semi-transparent image layer changes over time. The alpha blend may depend attributes of the base layer.

An image layer may include a photographic image, a still video image, a moving video image, or an image received from a non-TV input of the TV.

In another aspect, a TV system has a TV display, a TV tuner, and a processor simultaneously presenting on the TV display a solid base image layer and superimposed on the solid base image layer at least a first semi-transparent image layer with an alpha blend established to achieve semi-transparency. Both the solid base image layer and first semi-transparent image layer are simultaneously visible.

In still another aspect a method includes establishing a solid base image layer on a TV display using one of: TV signal input, digital photograph input, video disk input. The method also includes superimposing over the solid base image layer such that at least a portion of the base image layer remains visible a semi-transparent image layer. The semi-transparent image layer is derived from a video stream and/or a photograph.

The details of the present invention, both as to its structure and operation, can best be understood in reference to the accompanying drawings, in which like reference numerals refer to like parts, and in which:

BRIEF DESCRIPTION OF THE DRAWINGS

FIG. 5 is a non-limiting table showing how a particular source may be selected for background TV;

FIG. 6 is a non-limiting flow chart of logic that may be employed by the system of FIG. 1;

DETAILED DESCRIPTION OF THE PREFERRED EMBODIMENT

Figure 1:
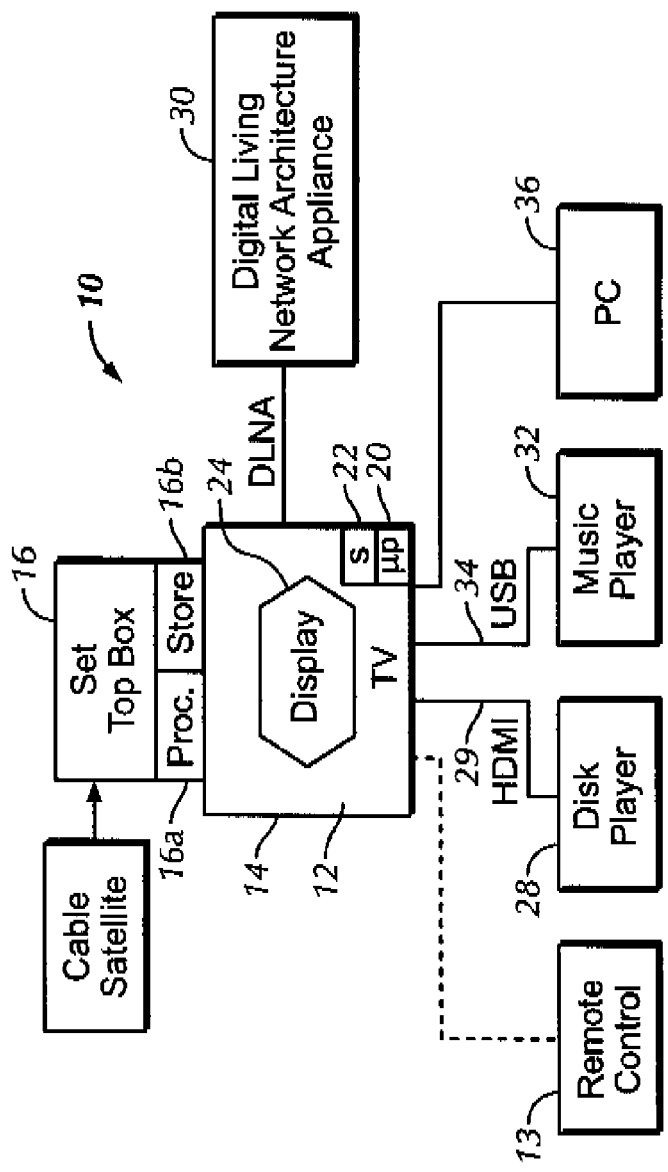
FIG. 1 is a non-limiting block diagram of a system in accordance with present principles.

Referring initially to FIG. 1, a system is shown, generally designated 10, which includes a television 12 controllable by a TV remote control 13 and defining a TV chassis 14 and receiving, through a TV tuner in, e.g., a set-top box 16 from a cable or satellite or other source or sources audio video TV programming. The tuner may be contained in the set box or in the TV chassis 14. When a STB is provided, the STB typically includes a STB processor 16a and STB tangible computer readable medium 16b.

Similarly, the TV 12 typically includes a TV processor 20 accessing a tangible computer readable medium 22. The tangible computer readable medium 22 may be established by, without limitation, solid state storage, optical or hard disk storage, etc. The tangible computer readable media herein may store software executable by one or more of the processors to, e.g., control a display driver that drives a TV visual display 24. The display 24 may be a flat panel matrix display, cathode ray tube, or other appropriate video display. The medium 22 may also contain additional code including 3D graphics software executable by the TV processor 20. One or more of the processors described herein may execute the logic below, which may be stored as computer code on one or more the computer readable media described herein.

In the non-limiting embodiment shown in FIG. 1 the TV 12 may receive programming from external components such as but not limited to a video disk player 28 such as a Blu-Ray or DVD player via a high definition multimedia interface (HDMI) line 29 and a digital living network architecture (DLNA) appliance 30 such as a personal video recorder (PVR) that can contain audio-video streams on a hard disk drive. The TV may also receive audio streams from a music player 32 over a universal serial bus (USB) line 34 as well as multimedia content from a personal computer 36. Additionally, the TV 12 can communicate via a network such as the Internet with content servers.

As used herein, the non-limiting term "background TV" refers to the special mode provided by present principles described further below, and, like the theme names discussed below, is used only for purposes of exposition, not limitation. The term live video texture (LVT) refers to the mapping of live video onto a 3D graphics object within a graphics or video plane.

Figure 2:
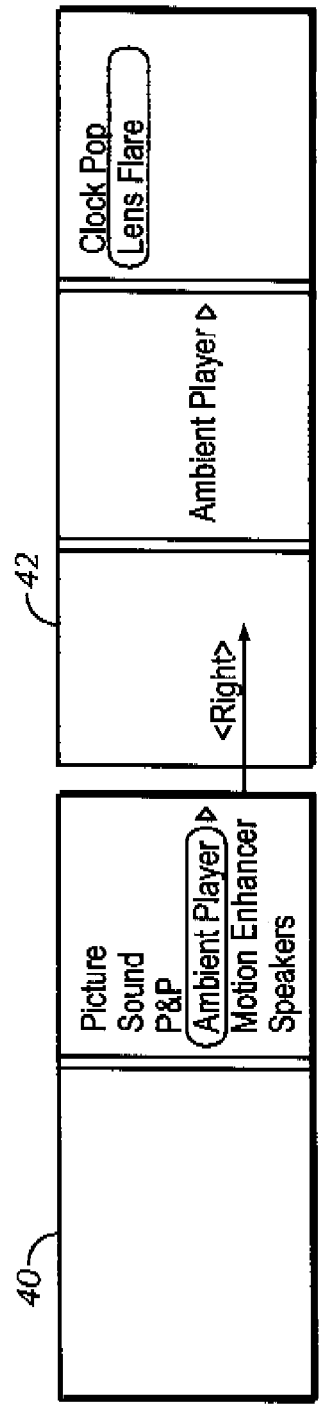
FIG. 2 are non-limiting screen shots showing a user interface that can be used to invoke background TV.

FIG. 2 shows two screen shots of the display 24 illustrating one non-limiting way to invoke the present background TV. Referring to the left screen shot 40, background TV may be accessed using the remote control 13 by pressing a <favorites> or <Options> key. This causes the illustrated menu to appear listing "background TV" which can be selected to cause the right screen shot 42 to appear. The right screen shot 42 displays the names of various background TV themes for selection, in this case, "storyboard" and "clock pop". Both of these themes are described further below.

Background TV may be accessible at any time when the TV 12 is in any one of the following input modes: RF, composite, component, HDMI, digital media port (DMPort), or PC. Background TV may also be accessible whenever the user selects USB or DLNA mode. Background TV may also be accessed from a "favorites" menu.

When accessing background TV from a "favorites" menu, within the content carousel, each background TV theme can be associated with a canned animated icon (a mini preview of what the theme is). Background TV can be accessed from the present assignee's cross-menu bar (XMB); when XMB is not available, an "options" menu can be used to access background TV. If a slideshow or a music visualizer is accessible from the options menu, background TV can be accessible.

When XMB is implemented, background TV may not be accessible from the first layer of the XMB but instead may be accessible on the second and third layers of XMB (files or folders). Examples of user actions to invoke background TV include; from XMB>Music>USB, in which case the options menu may not list background TV. Or, from XMB>Music>USB>User's Folder, in which case the options menu may list background TV. As yet another example, from XMB>External Inputs>HDMI, in which case the options menu may list background TV.

When background TV is invoked, an options menu can be presented to allow a user to add or remove background TV from a "favorites" menu. Typically, whenever background TV is accessed, the theme last launched (either through favorites or options) will assume the default focus in the options sub-menu.

In non-RF modes (i.e., when background TV is accessed when the TV is not in a mode in which TV programming is being received from, e.g., the STB but in another mode), the following non-limiting logic can be implemented. Accessing background TV can occur when in the external video input mode, including PC input mode. In contrast, when in modes such as a XMB photo or music viewer mode, selecting background TV will exit the TV from the current mode and display background TV themes using content from that mode.

To exit background TV and return to the previous mode, an appropriate key on the RC 13 may be manipulated. For example, if the user presses <RETURN>, background TV is exited and the current input, channel, or application displayed.

Figure 3:
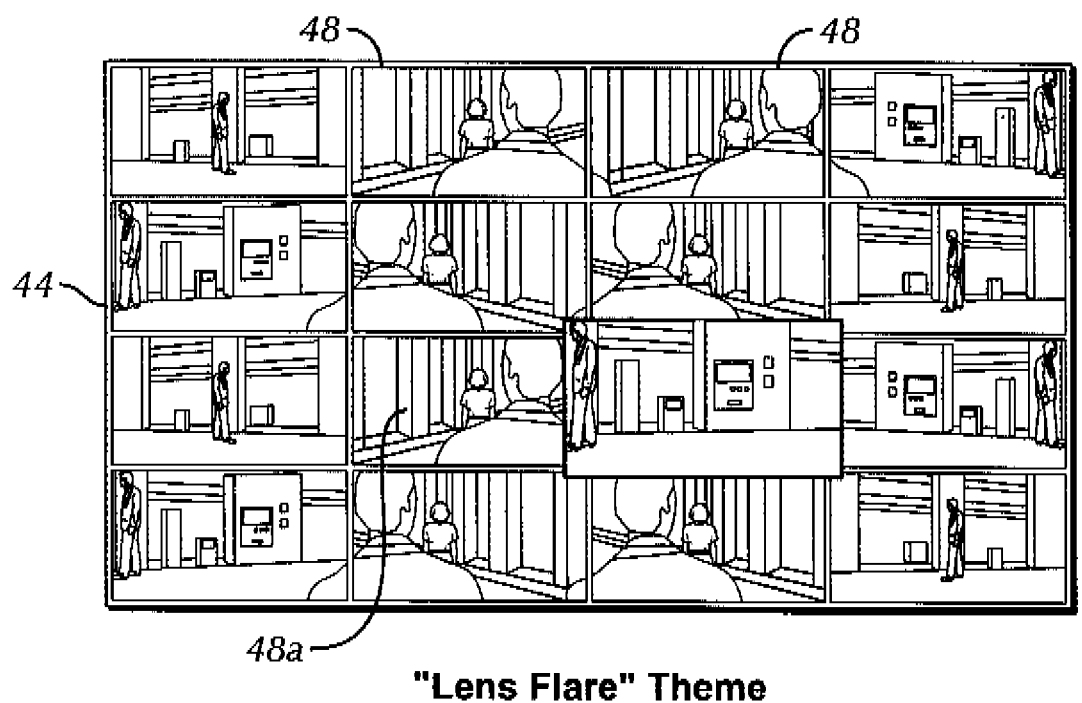
FIG. 3 is a non-limiting screen shot of the "Storyboard" theme.
Figure 4:
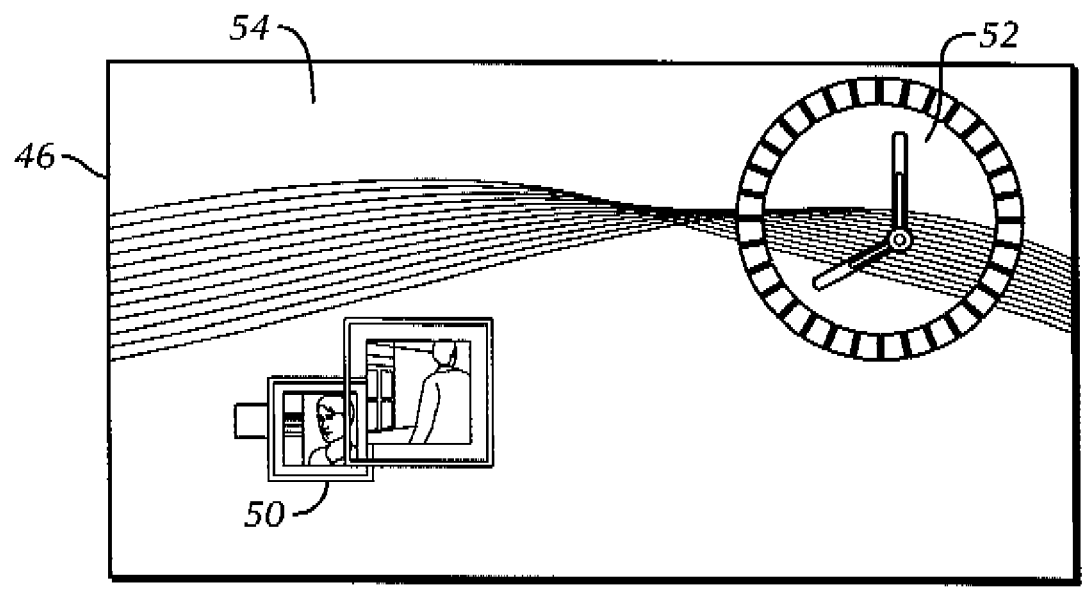
FIG. 4 is a non-limiting screen shot of the "Clock Pop" theme.

As mentioned above, multiple background TV themes maybe provided, with each theme preferably using content that depends on the mode of the TV when background TV is accessed in accordance with, e.g., the non-limiting example of FIG. 5 discussed below. FIG. 3 shows a screen shot 44 of one such theme that may be presented on the display 24, while FIG. 4 shows a screen shot 46 of a second such theme.

In essence, the theme shown in FIG. 3, labeled "storyboard" only for disclosure purposes, is a mosaic of image panes 48 that, when LVT is used as the theme content, are all derived from the same video feed. When the TV is in a photo application mode when background TV is accessed, the content of the panes 48 is derived from) e.g., the last-viewed photo, and similarly for a music visualization application. Present principles may be extended to deriving background TV pane 48 content from the content of other TV modes that may be played by the TV at the time that background TV is invoked.

In the non-limiting embodiment shown, plural panes 48, which may be established by visual place holders on a graphics plane, may be provided. At least one pane 48a may be graphically altered to produce a reflection effect as shown (note the subject looking to the left in pane 48a and to the right in the other panes). This reflection pane 48a can be capable of being live and can be animated when LVT is playing.

Upon starting background TV in the theme shown in FIG. 3, freeze frames of LVT can be made to pop into existence sequentially in random screen locations until the screen is full of panes 48. The freeze frames can be different tints of one color. The last pane to pop in is then replaced by the LVT, and it can be made to grow a bit larger than other panes, e.g., 110% of the size of other panes 48. The larger pane can display LVT for a short period and then freeze, change to another tint color, and shrink to normal pane 48 size. During the period the last frame in larger format is animating, another pane 48 (displaying a freeze frame) can begin to fade out, after which another LVT will begin at the same location. Thus, there can be a brief period of overlap in time when two panes 48 are animating.

If desired, after the first time LVT freeze frame panes 48 populate and fill the screen, all LVT freezing afterward can leave freeze frames of different colors. Also, an evaporation effect can be provided in which periodically an animation effect occurs with the current LVT finishing its animation. Then, all freeze frame panes pop out of existence, similar to the effect used to populate panes in the beginning. The panes 48 then pop back into existence and the algorithm described above repeat.

When the evaporation effect is applied, LVT will begin again. This time, the pane 48 LVT content can be derived from a different source than the last-tuned to channel, e.g., from the first channel in a "favorite channel" list. If no favorite channels are listed, the first channel in a channel history list may be used. If there is nothing in history besides the current channel, then LVT from channels in the entire channel map starting from the lowest available channel for current tuning mode, antenna or cable) can begin playing after evaporation occurs.

When photo content is used for pane 48 content, the same process can be followed except that pictures can appear for approximately five seconds. If the user has less than enough photos to fill all respective panes of the screens the entire screen can be filled with as many of photos that can fit.

In any case, the panes all display content from the same first source, evolve in appearance in the non-limiting way described through a cycle, and then repeat another cycle but with content commonly derived from a second source.

Turning to FIG. 4 for a description of a second background TV theme, as shown the display 24 is never filled with panes 50 but rather only a single or a few panes 50 appear at one time, along with an image 52 of a clock showing current time. The theme of FIG. 4 may be presented without the geometric fractal shown in the background.

The background 54 (i.e., portion of the display 24 that does not show images in panes 50) of the theme in FIG. 4 preferably changes colors. The panes 50 can float across the screen from, e.g., left to right, and then loop back and forth.

The content rules for the panes 50 are the same as those for the panes 48 in FIG. 3 and as more fully discussed below. If LVT is being used as the content for the panes, when a pane 50 reaches the edge of the screen, the LVT used for the content can be changed to be that from the first channel in a favorites list, then from history, and so on as described above for the theme shown in FIG. 3. The LVT in a pane 50 may play for a short period, then freeze, fade a bit without disappearing, then shrink in areal size. When photos are used as the content for the panes 50, the same rules can be followed. For both LVT and photo content, the faded and shrunk panes 50 can disappear once the panes reach the left or right edge of the screen.

FIG. 5 shows a non-limiting table 56 that correlates TV model capabilities in the left column with background TV access locations in the second column, current TV mode in the third column, and source of initial visual and audio content for the background TV display in the fourth and fifth columns.

As indicated in FIG. 5, a background TV theme can use video and audio from either LVT, a users device, or content built in to the background TV itself For all themes presented, if the user's selected input or mode allows LVT, then LVT preferably is used for video and audio.

Themes that use photo or audio content can shuffle (randomly select) through content as described above. Themes can function on TV models with or without photo/music XMB categories. Shuffling through content from another device (USB or DLNA), however, may not be allowed, whereas shuffling through folders or embedded folders (folders within folders) can be allowed.

FIG. 5 illustrates non-limiting dynamics between device content, the user's TV model, and the user's current mode. For example, LVT from the currently tuned-to channel (RF/composite mode) in TV models without photo/music capability (top row) initially (i.e., at background TV invocation) is used as a source for the initial content in the panes of either theme shown in FIG. 3 or 4, with shuffling through LVT content sources then proceeding subsequently as described above. In the second row, for such TVs in a HDMI mode, or component mode, or PC mode, photos and audios that are built in to the background TV are used when background TV is invoked. Likewise, LVT is used (third row) in the RF/composite mode for TVs that have photo/music capability.

The fourth row illustrates that XMB photo/music-capable TVs in the USB or DLNA or HDMI or component or PC mode access the non-limiting priority lists set forth below in establishing video and audio content of the panes of the selected background TV theme, starting with the first cycle. Thus, in the first cycle when the TV is in the photo view mode, the last photo selected provides the initial content for the panes, with succeeding photos providing the content for subsequent cycles. As indicated by the fifth row, the below-described visual priority list is used for theme content for such TVs in the DMPort mode, while DMPort audio is used for the audio content of the background TV theme.

The following specifies which device type may be accessed for photo content for the background TV. It is preferable to always use the content from the current mode selected as top priority: top priority, USB, next priority, DLNA, next priority, built-in photos on, e.g., flash memory of the TV 12.

For example, if the user enters DLNA mode that has ONLY photos, then he/she selects background TV, the processor executing background TV will check the audio priority list, which in one non-limiting embodiment maybe established by the following. Note that it is preferred to always use the content from the current mode selected as top priority. Top priority, USB; next, built-in audio on flash memory of the TV. DMPort can only be accessed when TV's input is in DMPort so it is not on the priority list. For example, if the user enters DLNA mode with photos, then he/she selects background TV, background TV will check the audio priority list.

FIG. 6 illustrates the principles above in flow chart format. At block 58 the processor receives a user signal from the RC 13 to enter background TV, and at block 60 the user's selection of the particular theme is received. The content for the panes of the theme is then derived at block 62 from the sources described above and as illustrated in one non-limiting embodiment by the table of FIG. 5. In some embodiments the panes can be mapped onto a 3D graphics plane at block 64 and displayed as described at state 66.

In non-limiting implementations, the following error processing may be used. Error messages may be displayed in the lower right corner of the display over the ambient theme. Because present principles are to encourage a passive experience, reverting to built-in photos or audio is preferred in the presence of an error rather than exiting background TV. Furthermore, messages such as clip messages or dialogs are not necessarily desired. Instead, preferably an alteration between trying to fetch content and checking for other devices or content is used. This is defined as the fetching algorithm. In one embodiment, the fetching algorithm is that, if photo or audio content is not available, built-in photo or audio is immediately displayed in background TV. During the time for the theme to process that built-in photo or audio, the user's next photo or audio is fetched to see if it is valid. If fetching is successful, the user's photo or audio is used for the theme. If fetching is not successful, built-in photo or audio is displayed. Repeat this algorithm infinitely. If the user has one photo, keep retrieving that one photo.

Errors related to LVT include the absence of a signal from the RF input or any other Input, in which case a blank black screen may be displayed with a clip message stating that there is no signal or no input (i.e., signal cannot be decoded). The clip message may be displayed on top of the current ambient theme. If a program or channel to be used as LVT in the background TV is blocked, a blank black screen can be displayed with a lock icon indicating that the program or channel is blocked.

If the system clock is not set (either due to TV power restart or user not setting the time), a system default time is used and animated to mimic clock operation. If aberrations to video playback (forward, rewind, pause, etc.) exist when background TV is started, the aberrated video (in slow motion or fast speed or reverse, for instance) may be displayed as video. Or, when video is being aberrated the system may treat the event as a "no signal" event as described above.

Figure 7:
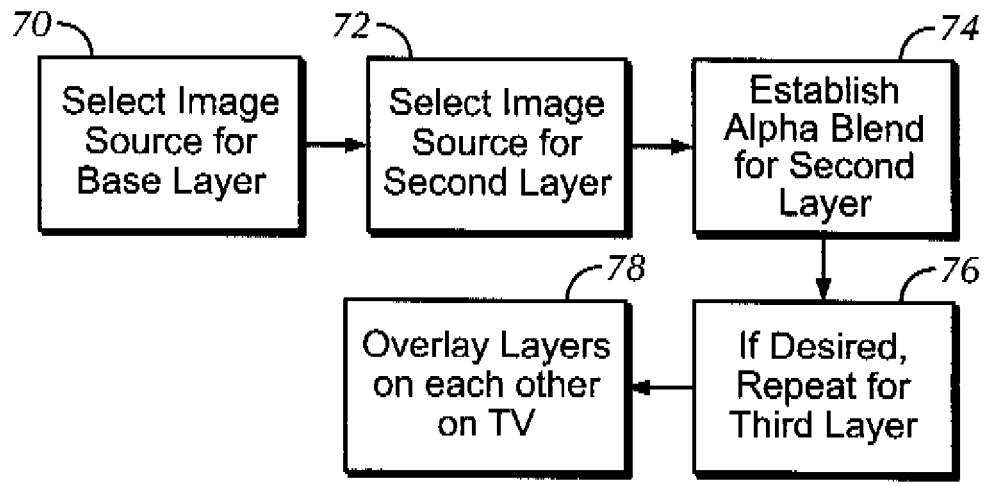
FIG. 7 is anon-limiting flow chart of logic that may be employed in an alternate embodiment to overlay multiple images onto each other.

FIG. 7 shows logic that may be used with any of the themes discussed above or as a standalone theme, in which a solid base image layer is displayed on a TV display and then one or more semi-transparent image layers are superimposed onto the base layer such that at least portions of all image layers are visible simultaneously with each other. Each image layer may be individually derived from live or still video from a TV signal, or from a photographic image, or from another input signal source such as a video disk player. Al or parts of the logic may be stored on a tangible computer readable medium in a TV and executed by a TV processor.

Commencing at block 70, the image for the solid base layer is selected. The selection may be pursuant to selecting a theme, e.g., when "background TV" is selected while viewing TV programming, the last tuned-to channel may be the source for the base image. Or, a single source may be pre-set in the factory so that the user need simply select an option, e.g., "overlay background TV", and the remaining logic is automatically executed. The viewer further may be given a menu option to select "still" or "moving" for the base layer but more preferably this choice is made in the factory and remains static, to relieve the viewer from additional selection chores.

An image source for a first semitransparent image layer is selected at block 72 in accordance with the same principles. The image source may the same source selected for the base layer or a different source. Or, it may be a different source. In one embodiment the base layer can be, e.g., the above-described "storyboard" theme while the semi-transparent layer can be, e.g., the "clock pop" theme. The viewer may be allowed to select the source or the selections at one or both blocks 70, 72 may be made in the factory.

Moving to block 74, the degree of semi-transparency of the semi-transparent image layer is established. In one embodiment this is done by establishing the alpha blend for the semi-transparent layer as desired to establish a desired degree of transparency.

In one implementation, alpha blending is a convex combination of two colors in a way that establishes the desired transparency effect, and may done using a graphics generator. Typically, the value of alpha in numeric code ranges from 0.0 to 1.0, where 0.0 represents a fully transparent color, and 1.0 represents a fully opaque color.

The value of the resulting color when a color value "$V_a$" with associated alpha value "$\alpha$" is drawn over the base layer with color value "$V_0$" is $(1-\alpha)V_0+\alpha V_a$. The alpha component may be used to blend to red, green and blue components equally, as in 32-bit RGBA, or, alternatively, there may be three alpha values specified corresponding to each of the primary colors for spectral color filtering. Less preferably, transparent colors and image masks may be used to establish semi-transparency.

In one embodiment, the alpha blend (i.e., the alpha value) is dynamic such that the transparency of the first semitransparent image layer changes over time. Or, it may be static. In some implementations the alpha blend can depend on an attribute of the base layer. For instance, less transparency may be established when the base layer is relatively dark, and more transparency may be established when the base layer is relatively light.

Proceeding to block 76, the above steps may be repeated for another (third total and second semi-transparent) layer that can be superimposed on the first two, such that all three images are visible simultaneously with each other. The images are displayed on a TV display at block 78.

Figure 8:
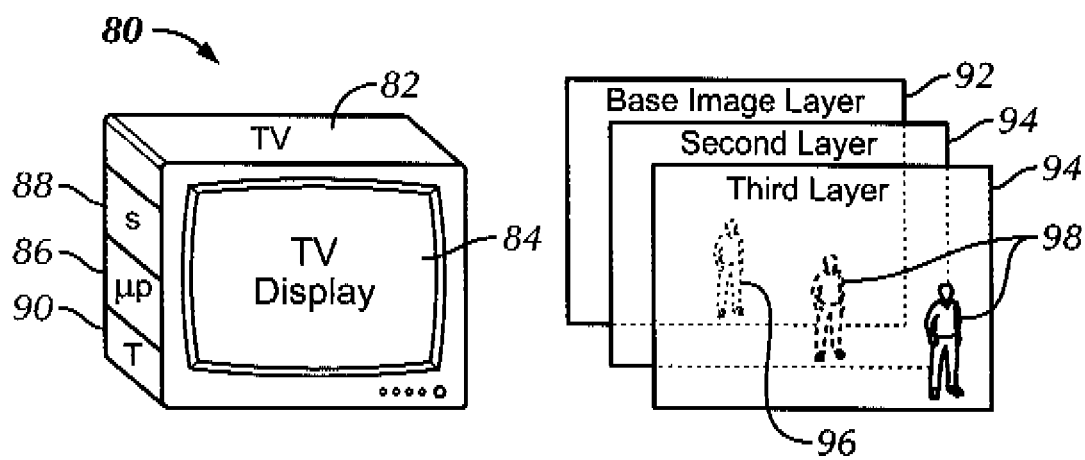
FIG. 8 is a schematic diagram showing a TV with multiple image layers in an exploded relationship, with parts of images shown in phantom for illustration.

FIG. 8 illustrates above principles. A TV system 80 includes a TV 82 with TV display 84, TV processor 86, and TV computer readable medium 88. An internal or external TV tuner 90 is also provided. FIG. 8 shows three image layers in an exploded relationship for illustration only, it being understood that the layers are superimposed on each other as described above on the TV display 84. Specifically, a base image layer 92 that is solid is the lowest layer, and then one or more semi-transparent image layers 94 are superimposed thereon. Images 96 in the base image layer 92 remain visible as shown, as do images 98 in the semi-transparent image layers 94.

While the particular OVERLAID IMAGES ON TV is herein shown and described in detail, it is to be understood that the subject matter which is encompassed by the present invention is limited only by the claims.

What is claimed is:

1. A TV system, comprising:
   a TV display; and
   a processor receiving a user signal to enter a special mode in which a first semi-transparent image layer is superimposed onto a solid base image layer and both layers are presented simultaneously on the TV display, wherein the base layer is not derived from other layers, and wherein the first semi-transparent image layer is characterized by an alpha blend, wherein the alpha blend is dynamic such that the transparency of the first semi-transparent image layer changes over time, wherein the alpha blend depends on at least one attribute of the base layer.

2. The system of claim 1, wherein a second semi-transparent image layer is overlaid onto the first semi-transparent image layer.

3. The system of claim 1, wherein at least one image layer includes a photographic image.

4. The system of claim 1, wherein at least one image layer includes a still video image.

5. The system of claim 1, wherein at least one image layer includes a moving video image.

6. The system of claim 1, wherein at least one image layer includes an image received from a non-TV input of the TV.

* * * * *